United States Patent [19]
Vlahu

[11] Patent Number: 5,949,359
[45] Date of Patent: Sep. 7, 1999

[54] VARIABLE RELUCTANCE RESOLVER TO DIGITAL CONVERTER

[75] Inventor: Saso P. Vlahu, Munster, Ind.

[73] Assignee: Kollmorgen Corporation, Waltham, Mass.

[21] Appl. No.: 08/853,390

[22] Filed: May 9, 1997

[51] Int. Cl.$^6$ .................................................. H03M 1/48
[52] U.S. Cl. ............................................................. 341/116
[58] Field of Search ................................. 341/116, 115; 318/661, 608

[56] References Cited

U.S. PATENT DOCUMENTS 4,268,786   5/1981   Rohrle ........................................ 318/661

*Primary Examiner*—Brian Young
*Attorney, Agent, or Firm*—Morgan & Finnegan

[57] ABSTRACT

A variable reluctance resolver wherein the sine and cosine values are processed to obtain digital values for position with an accuracy similar to that of a conventional resolver. The variable reluctance resolver is driven at a constant speed and the incremental digital values are recorded and processed to extract the fundamental through a Fourier transform. The Fourier transform of the fundamental is compared to the original values from the variable reluctance resolver to provide a look up table of correction values.

10 Claims, 8 Drawing Sheets

OCTANTS TABLE

|   | SIN+ | COS+ | \|SIN\| > \|COS\| | OCTANT |
|---|---|---|---|---|
| I | 1 | 1 | 0 | 000 |
| II | 1 | 1 | 1 | 001 |
| III | 1 | 0 | 1 | 010 |
| IV | 1 | 0 | 0 | 011 |
| V | 0 | 0 | 0 | 100 |
| VI | 0 | 0 | 1 | 101 |
| VII | 0 | 1 | 1 | 110 |
| VIII | 0 | 1 | 0 | 111 |

FIG. 5A

DIVISION TABLE

|   | LARGER | SMALLER |
|---|---|---|
| I | COS | SIN |
| II | SIN | COS |
| III | SIN | COS |
| IV | COS | SIN |
| V | COS | SIN |
| VI | SIN | COS |
| VII | SIN | COS |
| VIII | COS | SIN |

FIG. 5B

VARIABLE RELUCTANCE RESOLVER TO DIGITAL CONVERTER

BACKGROUND OF THE INVENTION

Resolvers are used extensively in motor control systems to provide angular position and velocity feedback. Generally, the conventional resolver includes a rotating primary winding energized from a carrier or reference frequency source via slip rings or the like. The conventional resolver also includes a pair of stationary secondary windings positioned in a quadrature relationship. The secondary windings provide signals at the carrier frequency with an amplitude envelope corresponding to sine $\theta$ and cosine $\theta$, respectively, where $\theta$ is the angular position of the resolver shaft. These signals are then demodulated to remove the carrier and recover the amplitude envelope. The sine $\theta$ and cosine $\theta$ signal values are then processed to determine the angle $\theta$ which is the shaft position. The advantages of the resolver over other types of position indicators are relatively low cost and virtually unlimited resolution provided by the continuous analog signals.

A known alternative to the conventional resolver is the variable reluctance resolver. Such resolvers do not have any rotating windings and therefore eliminate the need for slip rings or other forms of sliding contacts. The rotor structure is a relatively simple laminated iron salient pole structure without any deep slots which would otherwise be required to hold the rotating windings. The primary winding is on the stator and is energized from the carrier source. The secondary windings in a quadrature relationship are also on the stator. The energy coupled form the primary to the secondary windings depends on the reluctance of the coupling and is a function of the rotor position. Because of the simple rotor structure, variable reluctance resolvers are less expensive to construct. The variable reluctance resolvers, however, do not produce clean sine and cosine signals having a known relationship to shaft position and, as a result, are not usable in most servo applications where a high degree of linearity is required.

SUMMARY OF THE INVENTION

An object of the invention is to provide a variable reluctance resolver to digital converter with accuracy similar to that achieved using a conventional resolver. A variable reluctance resolver, although it does not produce signals having a clean sine and cosine relationship to the shaft angle position $\theta$, does provide highly reproducible signals as a function of shaft position. In the system according to the invention, a look-up table is created to correct the sine $\theta$ and cosine $\theta$ values. The variable reluctance resolver is driven at a constant speed and the distorted sine and cosine signals from the variable reluctance resolver are recorded. The distorted signals also pass through a Fourier transform to extract the fundamental sine and cosine waves. These fundamentals are then compared with the original distorted sine and cosine $\theta$ values from the resolver to create a correction look-up table of correction values. The look-up table preferably covers 360 degrees divided into octants.

In the normal operation where the shaft position $\theta$ is determined, the sine and cosine values (referred to herein as SIN and COS) are first compared to determine the octant for the angle $\theta$. The octant is determined on the basis of the polarity of the SIN and COS signals and by determining whether or not the SIN value has a larger absolute value than the COS value. The octant determination provides the three most significant bits indicating the shaft position.

The SIN and COS values are further processed according to the octant position. The correction value from the correction look-up table is applied according to the current octant. The smaller absolute value is divided by the larger absolute value to derive a tangent $\theta$ value ("TAN") in the range of 0 to 1.0. The TAN value is close to linear with a deviation of less than 7% maximum and therefore provides relatively uniform resolution throughout the range. The TAN values are then converted to linear values using a tangent look-up table.

The corrected TAN values are then inverted for odd octants and thereafter added to the octant values to provide the shaft angle position $\theta$. With these values, and assuming a sampling rate on the order of 1 millisecond, the velocity can be determined digitally as the difference in value between two successive angle position samples.

BRIEF DESCRIPTION OF THE DRAWINGS

The foregoing and other objects are achieved according to a preferred embodiment of the invention as described in the following drawings which are part of the specification.

FIG. 5A is a table used to determine the octants and FIG. 5B is a table used in determining TAN values.

DETAILED DESCRIPTION OF THE PREFERRED EMBODIMENTS

Figure 1:
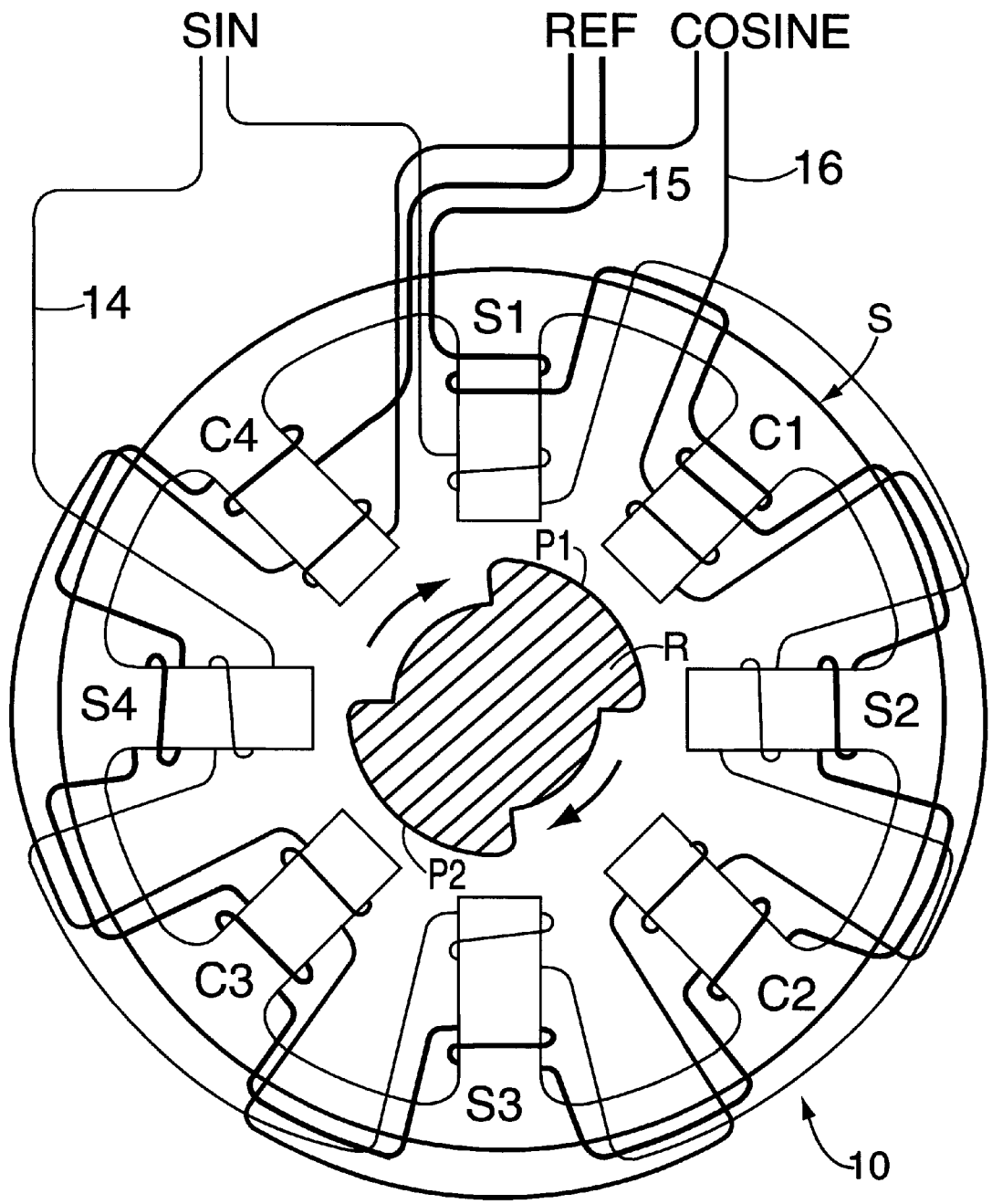
FIG. 1 is a diagrammatic cross-sectional view of a variable reluctance resolver.

The structure of the variable reluctance resolver 10 is as shown in FIG. 1. The stator is a laminated iron shell S in the form of a cylinder with inwardly projecting teeth S1–S4 and C1–C4. A reference winding 16 is wound around each of the teeth and is energized from the reference modulation source. A secondary sine winding 14 is wound around each of the teeth S1–S4. A secondary cosine winding 15 is wound around the C1–C4. The rotor R is a laminated iron structure shaped to provide salient poles P1 and P2.

The position of rotor R determines the reluctance coupling between the reference winding and secondary windings 14 and 15. The signal generated in sine winding 14 has an amplitude which is a poor approximation of sine $\theta$, where $\theta$ is the shaft angle position. Likewise, cosine winding 15 generates a signal having an amplitude which is a poor approximation of cosine $\theta$.

Figure 2:
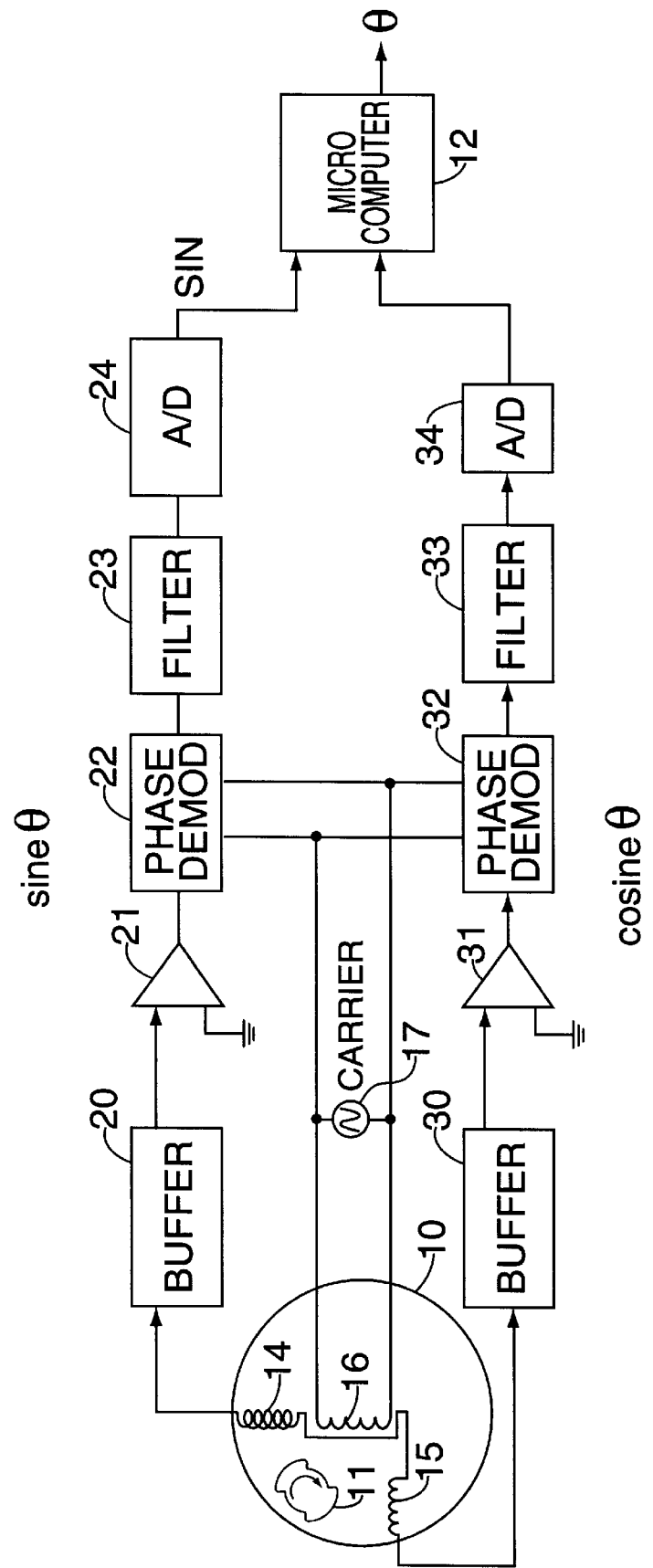
FIG. 2 is a block diagram of the resolver and associated units for processing the resolver signal and supplying same to a microcomputer as the SIN and COS values.

The hardware electronics portion of the system according to the invention is illustrated in FIG. 2 including the resolver 10 and a microcomputer 12. Windings 14 and 15 have a quadrature relationship and produce the sine $\theta$ and cosine $\theta$ signals, respectively. Primary winding 16 is excited from a carrier frequency source 17 which is typically in the range between 1 KHz and 20 KHz. In most cases the higher frequencies are preferred. The amplitude of the signals induced in secondary windings 14 and 15 is a poor approximation of sine $\theta$ and cosine $\theta$ respectively. The modulated signal sine θ passes through a voltage buffer 20 (typically in the form of a voltage follower) and then through a differential amplifier 21 connected to the common signal ground for the system. The buffer and differential amplifier combination connected to the common signal ground provides good noise rejection. The signal then passes through a phase demodulator 22 which removes the carrier leaving the envelope which is sine θ. The signal from the phase demodulator passes through a filter 23 which rejects the carrier frequency and passes the remaining signal on to analog-to-digital converter 24. The signal emerging from the A/D converter is designated SIN and is a 12-bit digital indication corresponding to the analog value sine θ.

In similar fashion the cosine θ signal originating from resolver winding 15 is processed through units 30–34 to provide the digital value of cosine θ which is referred to as COS. The COS signal is supplied to microcomputer 12. For most systems sampling of the analog signals in analog-to-digital converters 24–34 is typically accomplished at the rate of at least one sample per millisecond. The current SIN and COS values are stored at designated memory locations in microcomputer 12.

Figure 3:
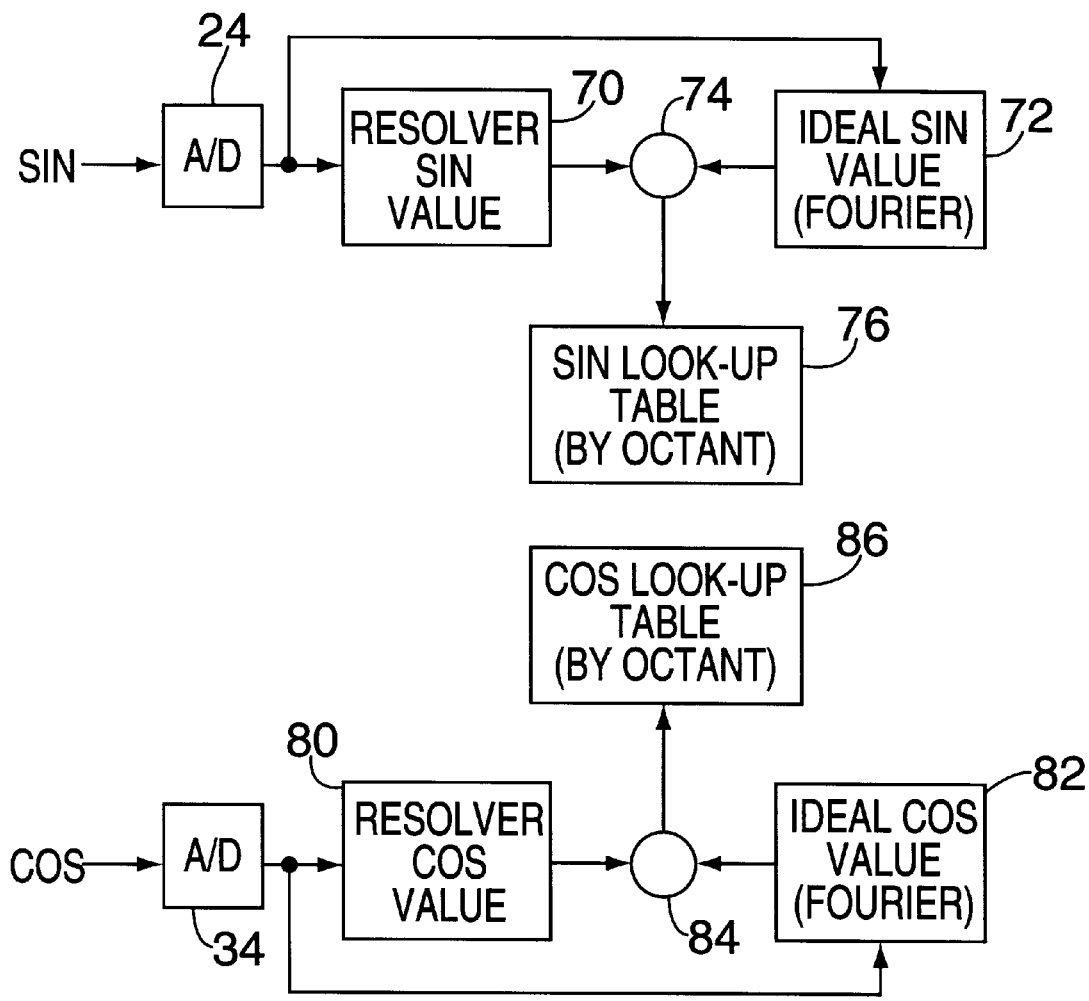
FIG. 3 is a functional diagram illustrating the technique according to the invention for creating correction look-up tables.

FIG. 3 illustrates a procedure used to create SIN and COS look-up tables which can correct the resolver signals so that they represent the true sine θ and cosine θ values. The resolver values for SIN which pass through A/D converter 24 are stored in a memory 70. The shaft is rotated at a constant speed such as 5000 RPM. Values are stored for the complete 360 degree rotation. The values form the resolver also pass through a Fourier transform which extracts the fundamental frequency and stores the sine values thereof in a memory within unit 72. The differences between the resolver values in memory 70 and the true sine values in memory 72 are determined in a summation 74 and are stored in a SIN look-up table 76. Since the same values appear more than once in a 360 degree rotation, the look-up values in table 76 are stored according to octant.

Similarly the COS values passing through AID converter 34 are stored in a memory 80 and compared with ideal values in memory within unit 82 to derive a COS look-up table.

Look-up tables 76 and 86 are preferably determined by averaging out values obtained at different shaft rotation speeds. Techniques other than Fornier analysis can be used to obtain the ideal values according to the fundamental frequency of the values received from the variable reluctance resolver. A variety of different formats for Tables 76 and 86 are possible.

Figure 4:
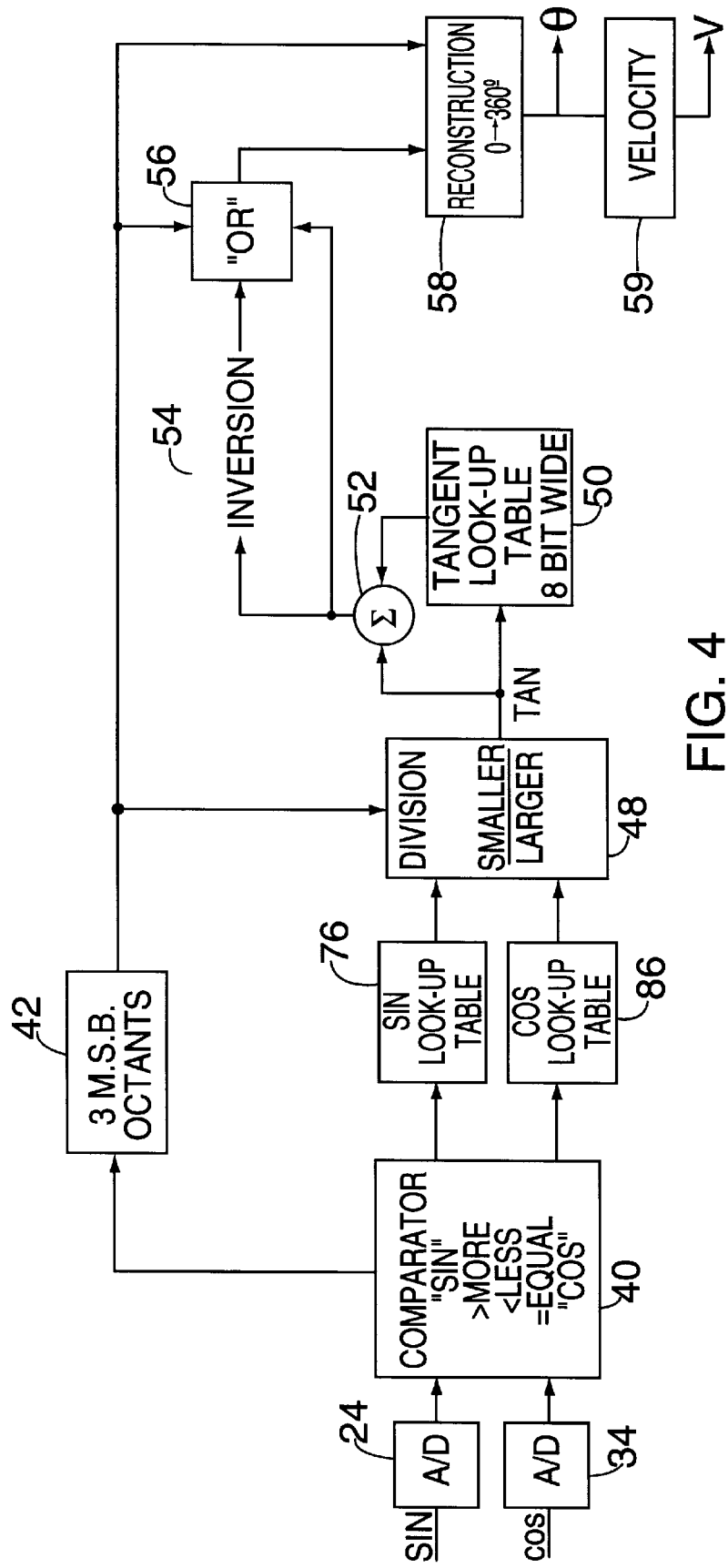
FIG. 4 is a functional diagram illustrating the computer processing of the resolver output signals.

As illustrated in FIG. 4, the processing of the SIN and COS values to determine the resolver angle θ includes (1) determining the octant for the angle θ, (2) determining the corrected SIN and COS values, (3) determining the tangent value TAN, (4) correcting the tangent value to obtain a linear value for the angle θ, and then (5) determining the angle θ by combining the octant and linear values.

In determining the tangent values it is necessary to avoid calculations that would cause the tangent value to go to infinity. This is achieved by always dividing the smaller of the absolute values of SIN and COS by the larger value. Over the 45° span of the octant the tangent values range from zero to one. The tangent values are close to the linear values for the angle θ and are corrected using a tangent look-up table. The final value for the angle θ is then determined by using the octant to provide the three most significant bits and the corrected tangent value for the lesser bits.

Figure 6A:
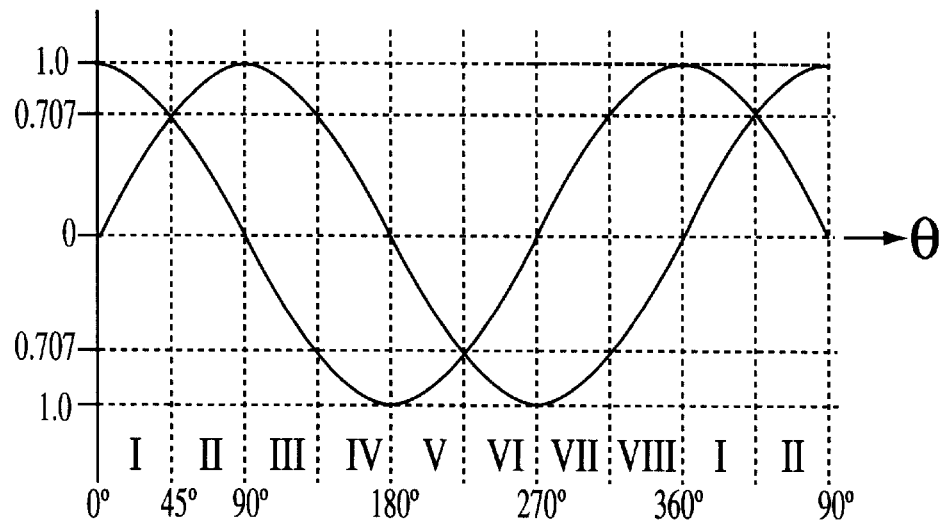
FIGS. 6A through 6H are illustrations of computer processing steps using SIN and COS signals from the resolver to determine the shaft angle $\theta$.

More specifically, the analog sine θ and cosine θ signals pass through analog-to-digital converters 24 and 34 which provide 12-bit digital words corresponding to the SIN and COS values, respectively. The sampling rate of the analog to digital convertor can be on the order of 20K samples per second. The SIN and COS values are compared in comparator operation 40 to determine the polarity and the relative magnitudes. For example, as shown in the Octants Table in FIG. 5A, if the SIN and COS values are both positive and the absolute value of the SIN value is not greater than the COS value, the resolver angle θ is in the fist octant I (000). Similarly, if the SIN and COS signals are both positive and the SIN value is greater, the resolver angle is in the second octant II (001). Other octants are determined in similar fashion following the logic in the Octants Table. The locations of octants I to VII relative to the SIN and COS values are shown in FIG. 6A. The 3-bit octant identifier is stored in memory 42 (FIG. 4).

Comparator 40 supplies the SIN and COS values to look-up tables 76 and 86. The tables are created as previously described in connection with FIG. 3. The SIN and COS values are adjusted according to the correction look-up tables as the SIN and COS values pass to divider 48.

Figure 6B:
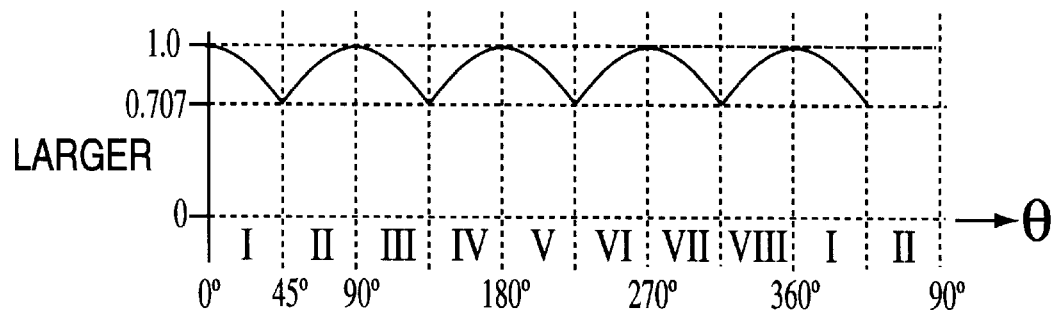
Figure 6C:
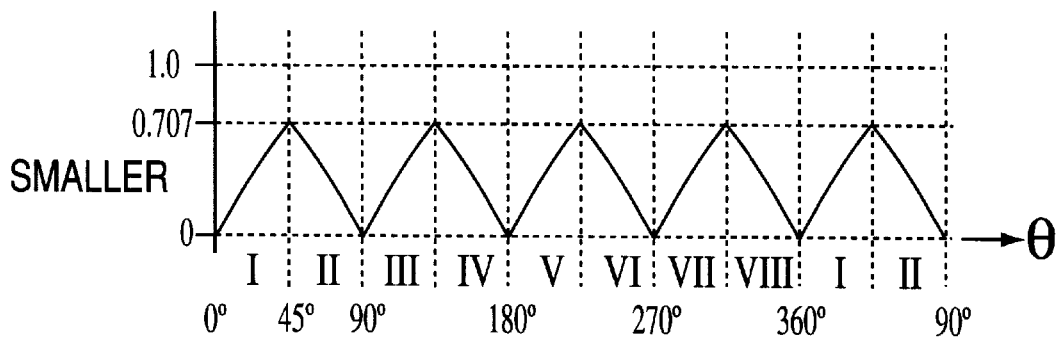

The comparison operation 40 also determines if the absolute SIN and COS values are greater or less than 0.707. If the value is greater than 0.707, it is the "larger" value used as the denominator in division 48, whereas if the value is less than 0.707, it is the "smaller" value and is used as the numerator in division 48. The "larger" and "smaller" values for the different resolver angles are shown in FIGS. 6B and 6C, respectively. The division operation 48 is used to obtain the tangent (TAN) value shown in FIG. 6D. By always dividing by the larger of the SIN and COS values, the TAN values are always between zero and one. Tangent values between one and infinity are avoided.

Figure 6D:
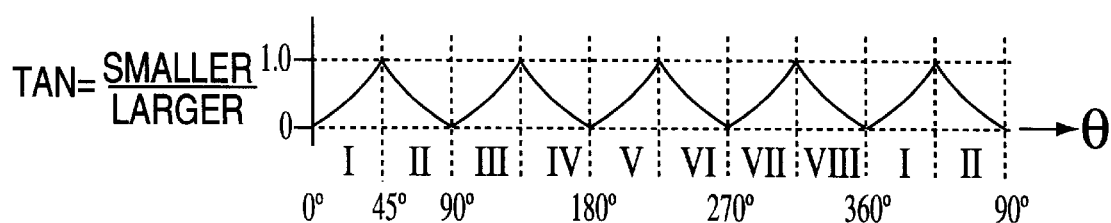
Figure 6E:
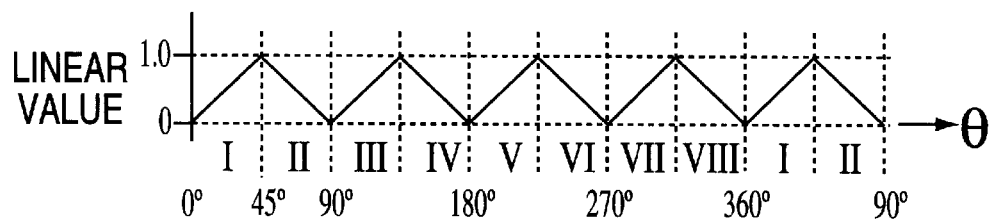
Figure 6F:
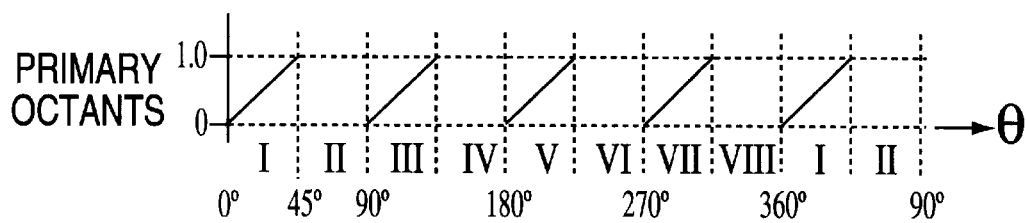
Figure 6G:
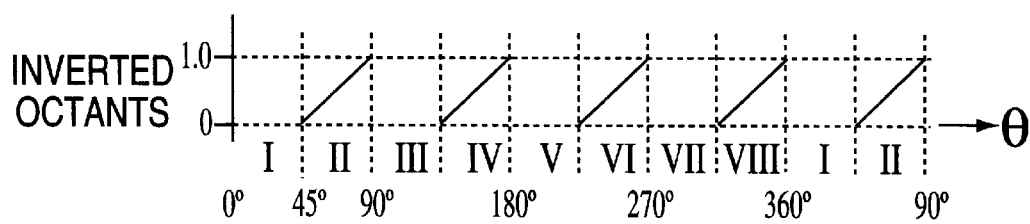
Figure 6H:
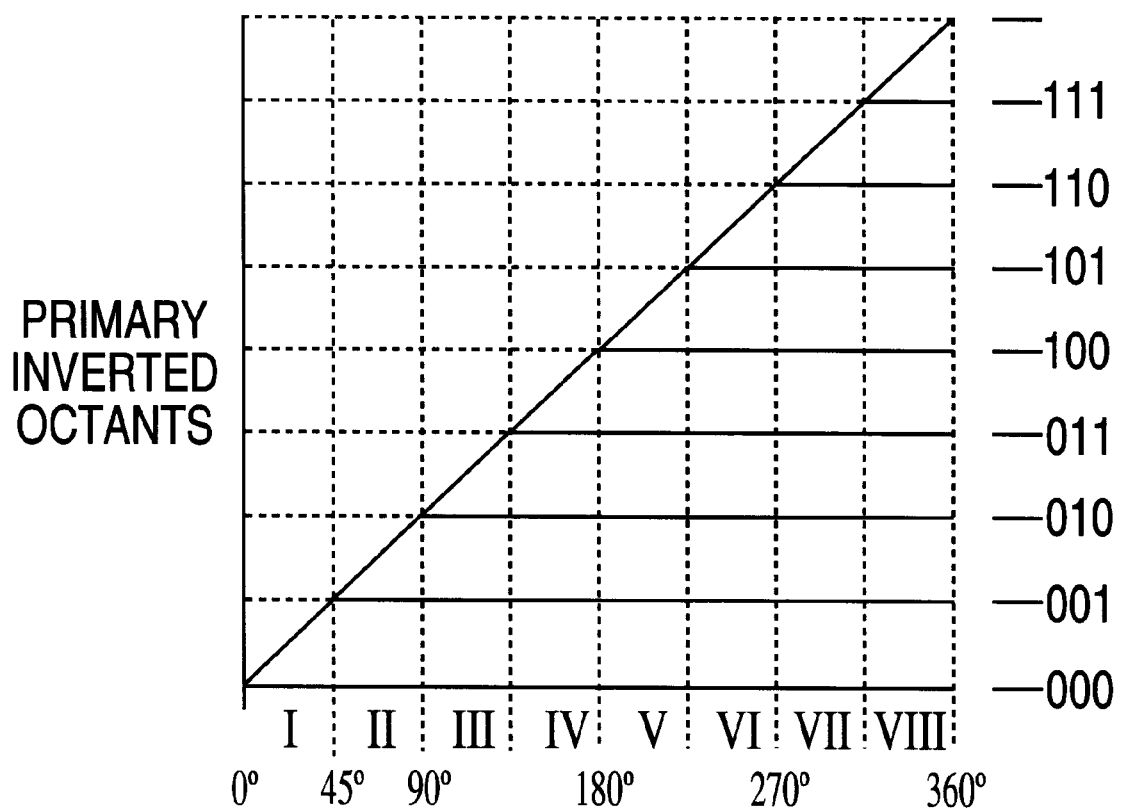

As shown in FIG. 6D, the TAN values within an octant, 0 to 45 degrees for example, are close to a linear relationship for the resolver angles. The deviation from the linear values is less than 7% and can be corrected using the 8-bit look-up table 50. The tangent look-up table value is added to the TAN value in summation 52 to derive the linear values shown in FIG. 6E. For most installations linear 11-bit values are sufficient. The linear values are inverted using inversion routine 54 and are then used and passed through OR logic 56 for the odd octants. The inverted linear values are used for the even octants.

In the final reconstruction 58 for the angle θ value, the octant 3-bit code value is used as the most significant three bits and added to the linear or inverted linear values as the 11 least significant bits. The resolver angle θ emerges as 14-bit code value covering the range from zero to 360 degrees in 16,384 increments.

The velocity is determined in a routine 59 which determines the difference in the angle θ for two successive samples.

While only one illustrative embodiment has been described in detail, it should be obvious that there are many variations within the scope of this invention which is more particularly defined in the appended claims.

I claim:

1. A method for obtaining accurate sine and cosine values from a variable reluctance resolver, comprising the steps of:
   (a) constructing a variable reluctance resolver including
       a stator and a rotor,
       a reference winding on said stator,
       sine and cosine windings on said stator displaced from one another by 90 electrical degrees, and salient poles provided on said rotor to vary reluctance between said winding according to the rotor position $\theta$;

(b) rotating said rotor at a constant speed;

(c) energizing said reference winding;

(d) converting the sine and cosine amplitude values generated in said sine and cosine windings into digital values;

(e) creating a look-up table of correction values for adjusting said digital value to accurately represent sine $\theta$ and cosine $\theta$.

2. The method according to claim 1 wherein said look-up table of correction values is determined by extracting waveforms of said digital values and storing values representing the differences between said fundamental waveforms and said digital values.

3. A method for obtaining accurate sine and cosine values from a variable reluctance resolver, comprising the steps of:

(a) constructing a variable reluctance resolver including
a stator and a rotor,
a reference winding on said stator,
sine and cosine windings on said stator displaced from one another by 90 electrical degrees, and
salient poles provided on said rotor to vary reluctance between said winding according to the rotor position $\theta$;

(b) energizing said reference winding from an alternating source;

(c) converting the sine and cosine amplitude values generated in said sine and cosine windings into digital values;

(d) adjusting said digital values to provide corrected sine $\theta$ and cosine $\theta$ values using a look-up table of correction values;

(e) determining the octant value for the angle $\theta$ from said digital values;

(f) dividing the smaller of said corrected values by the larger of said corrected values to derive a TAN value; and (g) determining the angle $\theta$ according to said octant value and said TAN value.

4. The method according to claim 3 further including the steps of
linearizing said TAN value,
inverting linearized values to even octants and adding said octant value as the most significant bits to the linearized values as the least significant bits to obtain angle $\theta$.

5. The method according to claim 3 wherein said octant value is determined by comparison of the signs of said digital values and the absolute magnitude of said digital values.

6. The method according to claim 3 wherein said look-up table of correction values is created by extracting the fundamental waveform from said digital values while rotating said resolver at a constant speed and by determining the differences between said fundamental waveform and said digital values.

7. A variable reluctance resolver to digital converter, comprising;
a variable reluctance resolver including
a stator,
reference, since and cosine winding on said stator, said sine and cosine winding being displaced from one another by 90 electrical degrees, and
a rotor providing salient poles for varying the reluctance between windings according to rotor position $\theta$;

a source connected to energize said reference winding;
means connected to said sine and cosine windings for converting resolver sine and cosine values into SIN and COS digital values;

means for determining the octant for the $\theta$ position from said SIN and COS digital values;

means for determining the octant for the $\theta$ position from said SIN and COS digital values;

a look-up table including correction values for adjusting said digital values to accurately represent sine $\theta$ and cosine $\theta$;

means connected to said look-up table and to receive said digital values to provide corrected SIN and COS values; and means for determining $\theta$ from said octant values and said corrected values.

8. The variable reluctance resolver to digital converter according to claim 7 wherein said look-up table is created by
rotating said resolver at a constant speed,
extracting the fundamental wave form of said SIN and COS digital values, and
storing in said look-up table the difference values between said digital values between said digital values and said fundamental waveform.

9. The variable reluctance resolver to digital converter according to claim 7 wherein said means for converting includes means for determining the octant for the angle $\theta$ in 3-bit code from said SIN and COS values;

means for dividing the smaller of the SIN and COS absolute values by the larger of the SIN and COS values to derive a TAN value;

means for linearizing said TAN value;

means for inverting linearized values for even octants; and means for adding said octant code as the most significant bits to said linearized values as the least significant bits.

10. A method for obtaining accurate sine and cosine values from a variable reluctance resolver, comprising the steps of:

(a) constructing a variable reluctance resolver including:
a stator and a rotor
a reference winding on said stator,
sine and cosine windings on said stator displaced from one another by 90 electrical degrees, and
salient poles provided on said rotor to vary reluctance between said winding according to the rotor position $\theta$;

(b) rotating said rotor at a constant speed;

(c) energizing said reference winding;

(d) converting the sine and cosine amplitude values generated in said sine and cosine winding into digital values;

(e) creating a look-up table of correction values for adjusting said digital values to accurately represent sine $\theta$ and cosine $\theta$, said look-up table of correction values being determined by extracting waveforms of said digital value using a Fourier analysis and storing values representing the differences between said fundamental waveforms and said digital values.

* * * * *